UNITED STATES PATENT OFFICE.

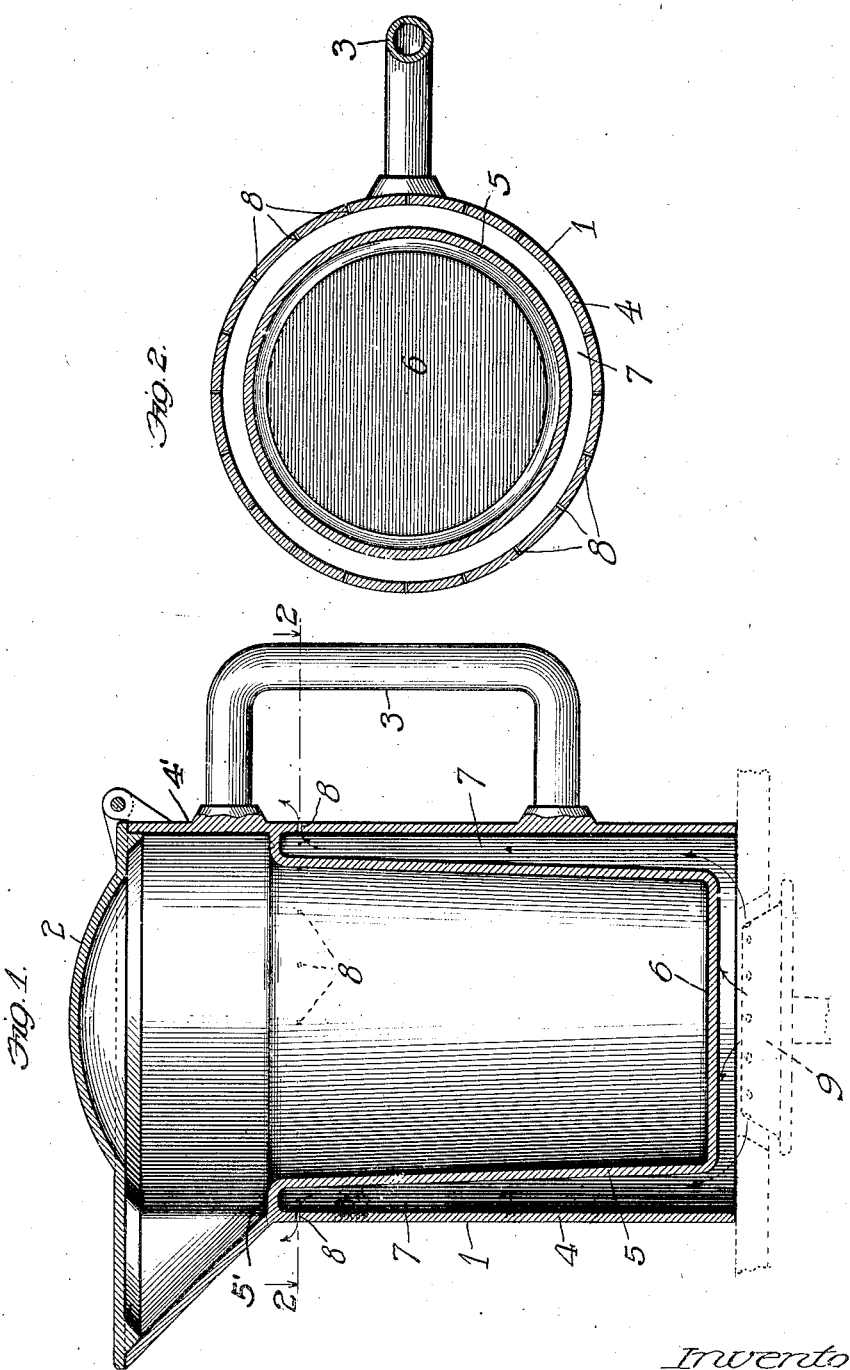

HARTWIG A. MOORK, OF CHICAGO, ILLINOIS, ASSIGNOR OF ONE-HALF TO ALFRED C. MOORK, OF CHICAGO, ILLINOIS.

KETTLE.

1,397,536.  Specification of Letters Patent.  Patented Nov. 22, 1921.

Application filed June 25, 1921. Serial No. 480,397.

*To all whom it may concern:*

Be it known that I, HARTWIG A. MOORK, a citizen of the United States of America, and a resident of Chicago, county of Cook, and State of Illinois, have invented certain new and useful Improvements in Kettles, of which the following is a specification.

This invention relates to heating receptacles for various articles, such as liquids, and especially to kettles. The main objects of the invention are to provide an improved form of kettle-like receptacle adapted to serve more efficiently in heating the contents, and adapted to protect the main body of the kettle from the surrounding air; to provide a unitary kettle with double walls having an air space adapted for admitting the products of combustion at the base and to discharge same upwardly and outwardly near the top.

An illustrative embodiment of this invention is shown in the accompanying drawings, in which—

Figure 1 is a vertical axial section through the kettle.

Fig. 2 is a horizontal section on the line 2—2 of Fig. 1.

In the construction shown in the drawings, the kettle is in a form adapted to be used as a coffee pot. The said kettle comprises a body 1, and a cover 2 hinged thereto, the former also having a handle 3 to facilitate use. Said body 1 is substantially cylindrical exteriorly, as represented by the outer wall 4. The inner wall 5 is offset inwardly near the top and converges downwardly to the bottom 6 which is elevated somewhat above the lower edge of the outer wall. The offset at 5' serves as an overflow ledge and is adapted to support a coffee bag ring or the like. The upwardly projecting wall part 4' serves as a non-scorching top zone. The chamber 7 between said walls is somewhat convergent in the upward direction, and at the top communicates with the outer air by means of a horizontal series of rather small perforations 8. In use the kettle is placed on the stove, part of which is indicated by dotted lines at 9, and is positioned to stand directly over the flame. The base of the kettle is of such a size relative to the burner that the flame and gases of combustion mainly rise in the chamber between said walls, and the outer wall serves to conserve the heat and effectually prevent in a very large measure the wasteful radiation and escape of heat such as occurs with kettles of ordinary construction.

Although but one specific embodiment of this invention has been herein shown and described it will be understood that numerous details of the construction shown may be altered or omitted without departing from the spirit of this invention as defined by the following claims.

I claim:

1. A unitary cast metal kettle comprising an inner cup-shaped receptacle, an outer wall spaced from said receptacle and extending beyond the upper and lower ends of said receptacle, a horizontally disposed annular supporting ledge connecting the upper edge of said receptacle with said outer wall, said ledge being arranged below and in spaced relation to the upper end of said outer wall for supporting a bag clamping ring, said outer wall having vents arranged adjacently below said ledge, and a spout formed on said outer wall above said annular supporting ledge.

2. A kitchen receptacle of the character described adapted for non-scorching use in applying flame heat to the contents, said receptacle having a flame chamber and double wall extending nearly to the top, and a single wall rim extending upwardly above the flame chamber and out of contact with the flame, the inner and outer walls being connected at the upper edge of the inner wall by an upwardly facing interior ledge member, and the outer wall having perforations beneath said ledge member for the escape of gases of combustion from said flame chamber.

Signed at Chicago this 23 day of June, 1921.

HARTWIG A. MOORK.